(12) United States Patent
Morin (10) Patent No.: US 7,296,666 B1
(45) Date of Patent: Nov. 20, 2007

(54) HEAVY-DUTY COVER FOR TORQUE CONVERTER

(75) Inventor: Michael G. Morin, Keene, NH (US)

(73) Assignee: Sonnax Industries, Inc., Bellews Falls, VT (US)

(*) Notice: Subject to any disclaimer, the term of this patent is extended or adjusted under 35 U.S.C. 154(b) by 239 days.

(21) Appl. No.: 11/174,267

(22) Filed: Jun. 29, 2005

(51) Int. Cl.
*F16H 45/02* (2006.01)
(52) U.S. Cl. .................................... 192/3.28
(58) Field of Classification Search ............. None
See application file for complete search history.

(56) References Cited

U.S. PATENT DOCUMENTS

| | | | | |
|---|---|---|---|---|
| 4,785,924 A | 11/1988 | Jackel | ............ | 192/3.29 |
| 4,821,855 A | 4/1989 | Jackel | ............ | 192/3.29 |
| 5,407,041 A | 4/1995 | Fukunaga et al. | ...... | 192/3.29 |
| 5,515,955 A | 5/1996 | Victoria et al. | .......... | 192/3.28 |
| 2006/0000682 A1* | 1/2006 | Yamamoto et al. | ...... | 192/3.29 |

* cited by examiner

*Primary Examiner*—Rodney H. Bonck
(74) *Attorney, Agent, or Firm*—Clifford F. Rey (57) ABSTRACT

A heavy-duty replacement torque converter cover for an automatic transmission designed to withstand the mechanical stresses generated during the torque converter lock-up cycle and other peak torque events in diesel engine pick-up trucks is disclosed. The present cover includes an internal spline that achieves up to a 70% increase in spline tooth engagement with a mating friction plate in the lock-up clutch in comparison to the original equipment cover providing increased torque capacity to the lock-up clutch. This is accomplished by machining a true internal spline within the cover on gear shaping equipment instead of utilizing the so-called Grob cold forming method, which provides only a simulated internal spline comprised of interlocking embossments having substantially less torque capacity than the present internal spline. The present cover also provides a thicker lock-up clutch surface, increased structural support for stud weldments, reduced stress cracking, improved heat dissipation, and increased service longevity.

17 Claims, 11 Drawing Sheets

HEAVY-DUTY COVER FOR TORQUE CONVERTER

BACKGROUND OF INVENTION

The present invention relates to automatic transmissions for land vehicles and, more particularly, to a heavy-duty torque converter cover for an automatic transmission of a land vehicle such as FORD E4OD and FORD 4R100 transmissions (hereinafter "FORD transmissions), and other similar automatic transmissions.

The torque converter of an automatic transmission replaces the clutch used in manual transmissions. It is the primary component for transmittal of power between the engine and the transmission in an automotive vehicle. The basic principle of torque converter operation can be observed by placing the blades of two electric fans opposite each other and turning on one of the fans. If one of the fans is turned on, the force of the air column produced will act upon the motionless blades of the other fan, which will begin turning and eventually reach a speed approaching the speed of the powered fan. The torque converter employs an analogous mechanism using automatic transmission fluid (hereinafter "ATF") to provide a fluid coupling between the engine and the transmission of an automobile, which provides for a smooth conversion of torque from the engine to the mechanical components of the transmission.

In the FORD transmissions a drum-shaped, torque converter cover (hereinafter "cover") is connected by threaded studs to the engine flywheel at its forward end and is also welded to the converter pump (i.e. impeller) so that the impeller will rotate at engine speed. It is known in the industry that when the FORD transmissions, which were initially designed to operate behind a lower powered truck engine, are utilized in a higher horsepower vehicle such as behind a FORD F-250 or F-350 diesel engine or the FORD Titan V-10 truck engine, the structural strength of the original equipment manufacture (hereinafter "OEM") torque converter cover is inadequate and as a result failure of the cover often occurs during converter lock-up and other peak torque events.

Further, in the automotive aftermarket engine tuning modules are marketed for such FORD trucks and SUVs, which deliver the most powerful, street-legal tuning available for towing the maximum loads allowed by the vehicle manufacturer. At such higher horsepower gains the OEM torque converter cover is overmatched and subject to mechanical stress and structural damage.

Thus, the present invention has been developed to resolve this problem and other shortcomings of the prior art.

DESCRIPTION OF RELATED PRIOR ART

There are known prior art patents in the field and their discussion follows. One example of a lock-up device for a torque converter comprising a disk-shaped piston and a damper disk is disclosed in U.S. Pat. No. 5,407,041 to Fukunaga et al. In this patent the piston 10 has in its radially outer end a spline part 10a engaged with a plurality of engaging projections 12 provided with circumferentially equal spacing and parallel to the rotational axis on a radially inner surface of the cylindrical projection 4a in the front cover 4. However, such prior art torque converter covers are not adequate for the purposes of the present invention U.S. Pat. Nos. 4,785,924 and 4,821,855 to Jackel disclose a lock-up clutch for a torque converter comprising a piston-like input element 15, a first clutch disc 17 having radially inwardly extending torque transmitting portions, and a second disc 18 which is installed axially between the input element 15 and disc 17 and has radially outwardly extending torque transmitting portions 19a. The housing 10 includes a substantially cylindrical section 10a which surrounds the discs 17, 18 and the input element 15 and whose internal surface is provided with torque transmitting portions 20a. Each torque transmitting portion 20a includes a radially inwardly extending prong 20c and the prongs 20c alternate with the torque transmitting portions 19a of the disc 18 in such a way that the disc 18 has freedom of axial movement relative to the cylindrical section 10a. The torque transmitting portions 20a jointly form a one-piece circular band at the inner side of the cylindrical section 10a. However, such a sheet metal band constructions (i.e. prongs 20c) spot welded to the inner surface of housing (i.e. cover) are not comparable to the structural features of the present invention.

Another example of a torque converter lock-up clutch including a torque converter cover having a simulated internal spline is disclosed in U.S. Pat. No. 5,515,955 to Victoria et al. In the Victoria et al. patent a simulated internal spline comprised of interlocking embossments 74 is formed in the cover 14 using a cold forming method (i.e. the Grob process) to achieve the driving connection between the cover and a mating friction disc 60 carried in the lock-up clutch assembly. In this device mating teeth 72 formed about the periphery of the friction disc 60 engage the embossments 74 to permit torque transfer through the cover 14.

However, it is known in the industry that such so-called Grob splines described hereinabove provide reduced spline tooth engagement (i.e. mating contact on tooth flank surfaces) and less torque capacity due to the inherent limitations of such cold forming processes. More particularly, such cold forming process can only be employed on lower grade steel alloys of a limited material thickness.

In this respect the present invention substantially departs from the concepts and designs of the prior art, and in so doing provides a torque converter cover capable of withstanding the mechanical stresses generated within the torque converter lock-up clutch utilized in such FORD F-250 or F-350 diesel engines, FORD Titan V-10 engines, and other similar truck applications.

SUMMARY OF THE INVENTION

Accordingly, the present invention is a torque converter cover (hereinafter "cover") for an automatic transmission such as FORD E4OD, FORD 4R100 transmission or other similar transmission, which is designed to withstand the mechanical stresses generated during the torque converter lock-up cycle and other peak torque events in the FORD transmissions utilized with FORD F-250 or F-350 diesel engines, FORD Titan V-10 engines and similar truck applications.

The present cover is fabricated from a high quality AISI 1026 steel forging and includes an internal spline manufactured in accordance with the American National Standards Institute (ANSI) B92.1-1996 Involute Splines standard. Manufactured to this standard the present internal spline provides up to a 70% increase in spline tooth engagement with the mating teeth of the OEM friction plate as compared to the tooth engagement achieved in the FORD OEM cover. This is accomplished by machining a true internal spline about the inner periphery of the present cover on conventional gear shaping equipment instead of utilizing the OEM cold forming method (i.e. so-called Grob method) that provides only a simulated internal spline comprised of interlocking embossments having substantially less torque capacity.

In addition, the present cover is constructed with a substantially thicker cross-section (i.e. axial length) at the converter clutch lock-up surface providing increased support for the threaded studs and eliminates the stud flanges, which attach the cover to the engine flywheel in the OEM version. The increased thickness at the lock-up surface also reduces stress concentration at the stud weldments and improves heat dissipation and service longevity.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE INVENTION

Prior to describing the present invention in detail, it may be beneficial to briefly review the structure and function of the torque converter and the torque converter clutch of an automatic transmission wherein the present invention is utilized. With further reference to the drawings there is shown therein a partial cross-sectional view of a torque converter assembly, indicated generally at 100 and illustrated in FIG. 1, which is the primary component for transmittal of power between the engine and the automatic transmission or transaxle in an automotive vehicle. The torque converter assembly 100 provides for a smooth conversion of torque from the engine to the mechanical components of the transmission and also functions to multiply torque from the engine enabling the vehicle to achieve additional performance when necessary.

Figure 1:
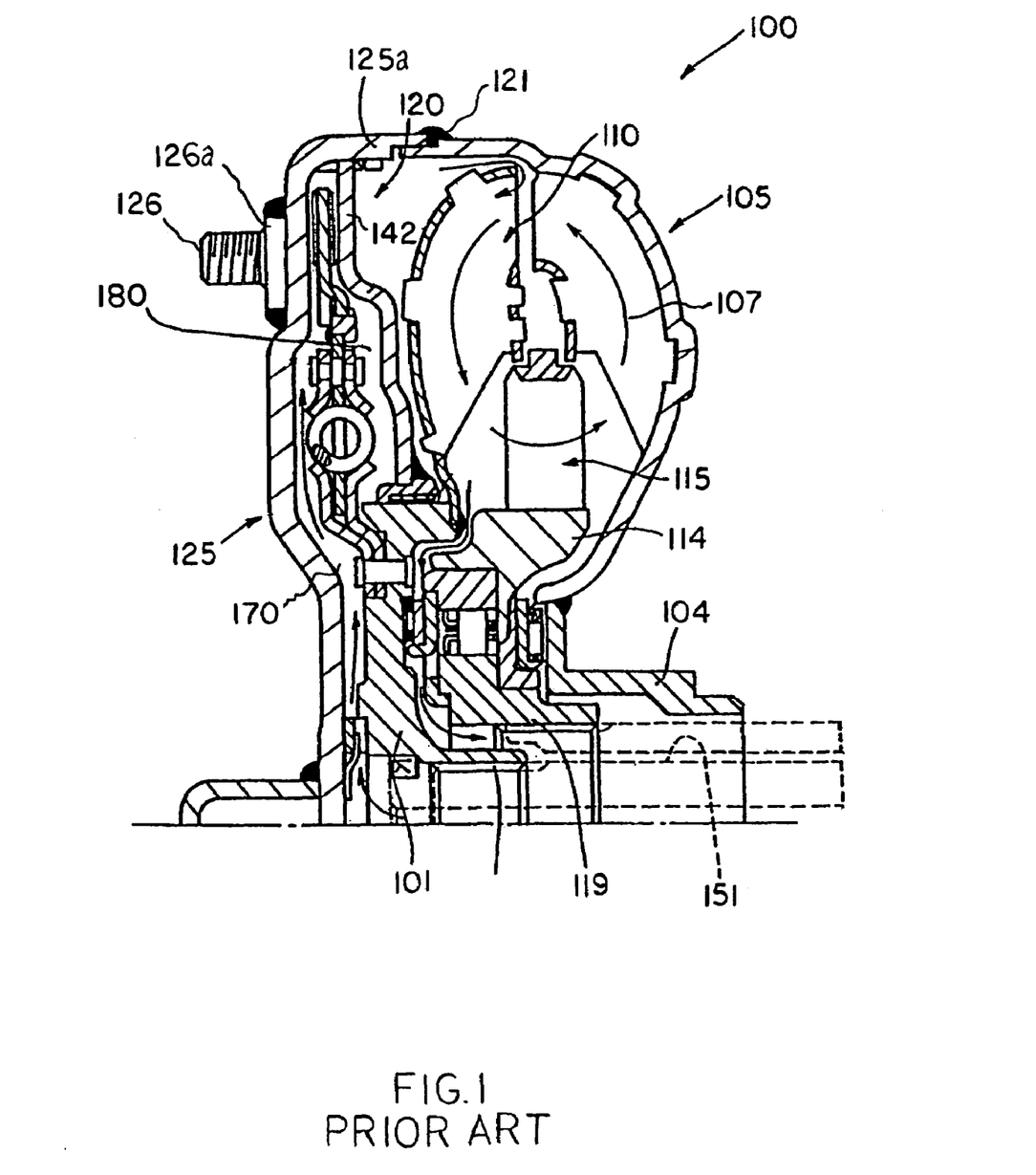
FIG. 1 is a partial longitudinal cross-section of a torque converter assembly including an impeller assembly, a turbine assembly, and a torque converter cover and is labeled Prior Art.

Torque converter assembly 100 is comprised of the following main sub-assemblies: (1) an impeller or converter pump assembly, indicated generally at 105, which is the driving member; (2) a turbine assembly, indicated generally at 110, which is the driven or output member; (3) a stator assembly, indicated generally at 115, (4) a lock-up clutch, indicated generally at 120, which is attached to the turbine assembly 110 to enable direct mechanical drive; and (5) a torque converter cover, indicated generally at 125, which is typically welded at 121 to the impeller assembly 105.

Figure 2:
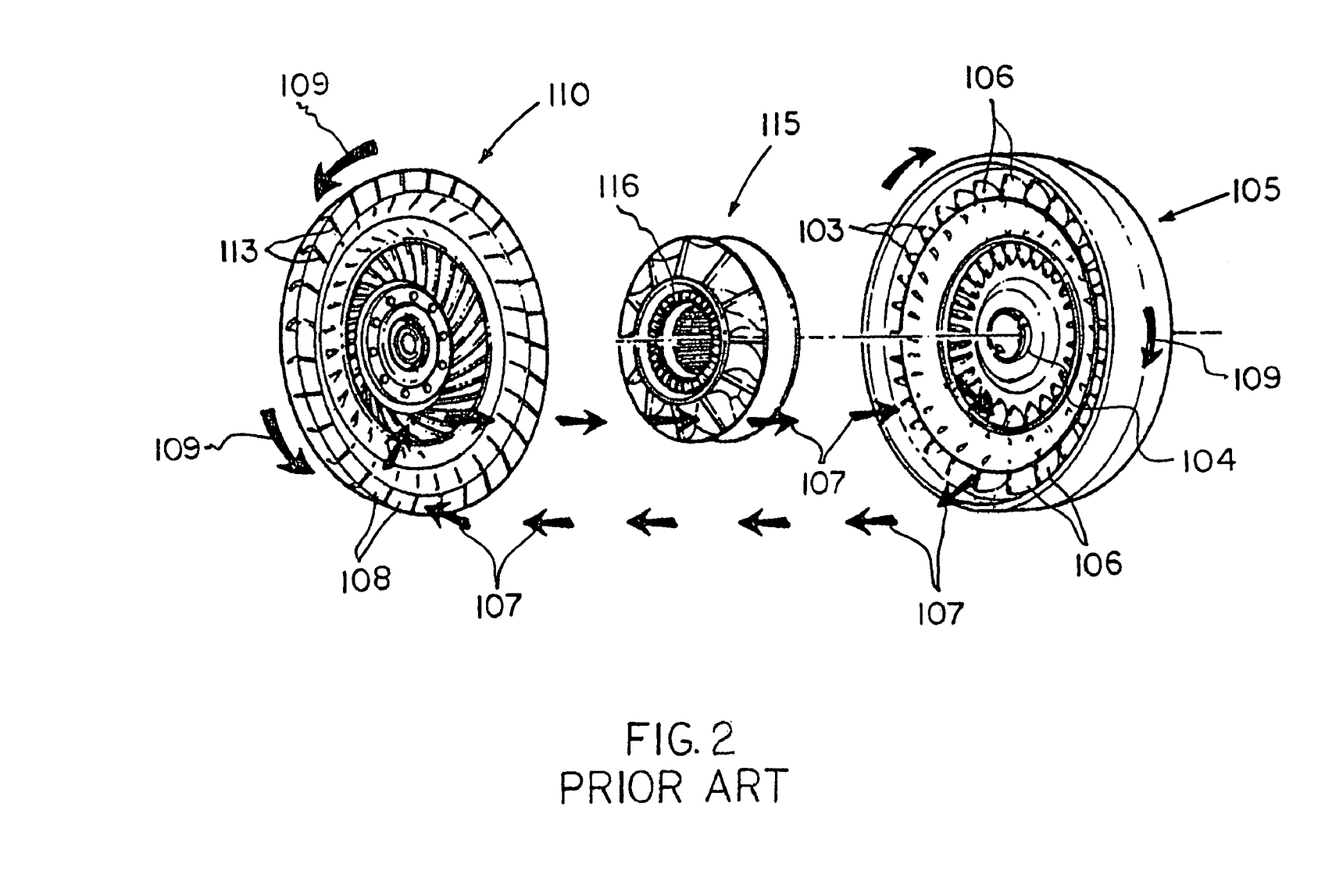
FIG. 2 is an exploded perspective view of the turbine, stator, and impeller assemblies of FIG. 1 illustrating the flow of automatic transmission fluid therein and is labeled Prior Art.

Cover 125 is connected to the engine flywheel (not shown) by threaded studs 126 including stud flanges 126a so that it will rotate at engine speed. When the engine is running, the impeller assembly 105 acts as a centrifugal pump by picking up ATF at its center and discharging it at its rim between the impeller blades 103 as more clearly shown in FIG. 2 (see directional arrows 107) establishing toroidal ATF out-flow passages 106 in fluid communication with toroidal ATF in-flow passages 108 defined by turbine blades 113. The force of the ATF hits the turbine blades 108 and causes turbine assembly 110 to rotate as indicated (see directional arrows 109). As the engine and impeller assembly 105 increase in speed, so does the turbine assembly 110.

Figure 3:
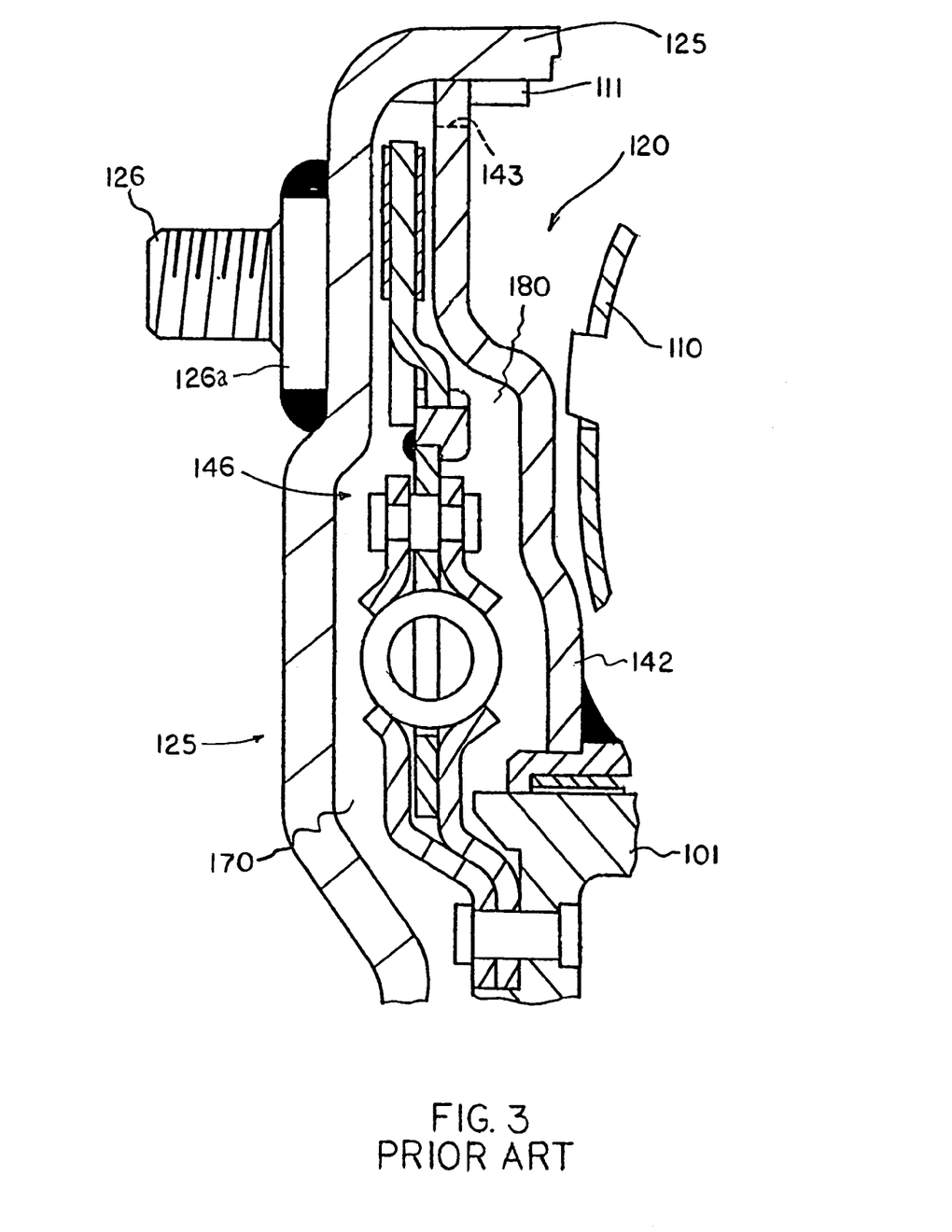
FIG. 3 is an enlarged partial longitudinal cross-section of the torque converter assembly of FIG. 1 showing further details thereof and is labeled Prior Art.

As shown in further detail in FIG. 3, the prior art pressure plate 142 including peripheral teeth 143 engages inwardly extending projections or ribs 111 formed on the inner surface of cylindrical portion 125a of cover 125 and also attaches to the turbine hub 101 to provide a mechanical coupling of the engine to the transmission during the converter lock-up cycle. When the lock-up clutch 120 is applied, the slippage that occurs through the fluid coupling is eliminated thereby providing a direct mechanical drive for efficient transfer of engine torque to the drive wheels.

Referring again to FIGS. 1-2, the stator assembly 115 is located between the impeller assembly 105 and the turbine assembly 110 and is mounted on a stator carrier 114 that is connected to an inner race 119 through a one-way roller clutch 116, which allows rotation in only one direction. The function of the stator assembly 115 is to redirect fluid returning from the turbine assembly 110 (see directional arrows 107) to assist the engine in turning the impeller assembly 105.

The impeller assembly 105 is supported by an impeller hub 104 (FIG. 1), which extends from the impeller assembly 105 along its longitudinal axis and engages the hydraulic pump (not shown) in the transmission. The transmission input shaft 151 (FIG. 1) extends through the impeller hub 104 and delivers power to the transmission.

When the lock-up clutch 120 is installed within the torque converter cover 125 as most clearly shown in FIG. 3, a clutch release chamber 170 is formed between the cover 125 and the lock-up clutch 120. When the fluid pressure behind the lock-up clutch 120 in the clutch apply chamber 180 exceeds the pressure in the release chamber 170, the lock-up cycle is initiated and the clutch is energized establishing a mechanical torque flow path coupling the engine flywheel to the transmission.

Figure 4:
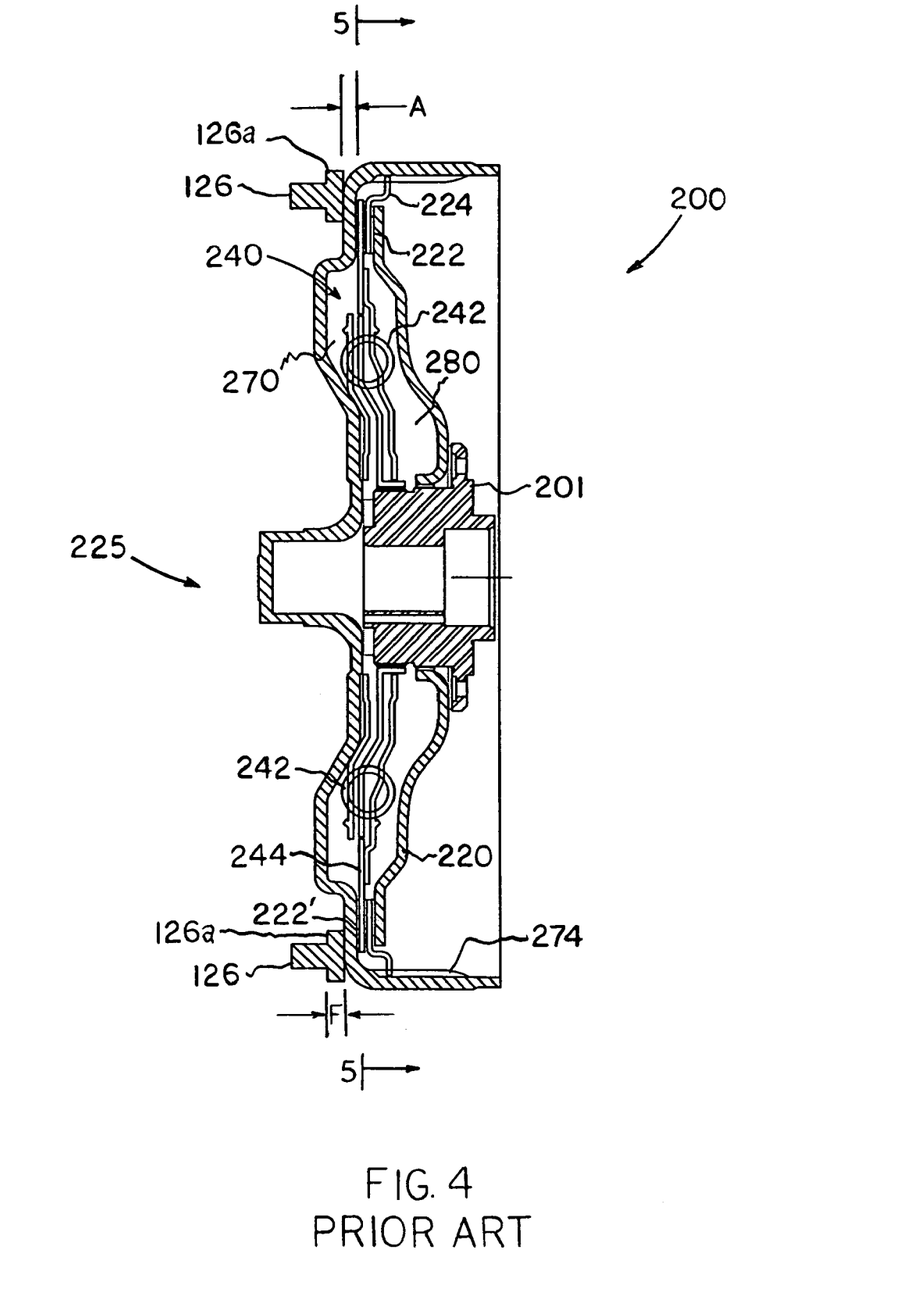
FIG. 4 is a partial longitudinal cross-section of a FORD E40D torque converter cover including a torque converter lock-up clutch wherein the present invention is utilized and is labeled Prior Art.

The latest versions (2000 to present date) of the FORD E4OD and 4R100 transmissions use a more modern system of converter lock-up that is used in virtually all transmissions being produced for automobiles today: the electronic/ hydraulic converter clutch assembly. The lock-up cycle in the electronic converter clutch systems is controlled by the Powertrain Control Module (PCM) within the vehicle's onboard computer (not shown). The mechanical components of the FORD E4OD electronic/hydraulic converter clutch assembly are illustrated in FIG. 4 and indicated generally at 200. In this embodiment the lock-up clutch assembly 200 includes a pressure plate 220, a splined friction plate 224, and a damper assembly, indicated generally at 240, installed within the front cover 225 just forward of the turbine assembly as shown. Friction plate 224 includes friction material 222 on its aft surface, which contacts the adjacent forward surface of the pressure plate 220 during the converter lock-up cycle. Damper plate 244 also has friction material 222' on both its forward and aft surfaces, which engages a machined lock-up surface 245 formed on the outer periphery of the radial wall 224 of cover 225 (FIG. 6) during lock-up.

In a so-called multiplate lock-up clutch of the type shown in FIG. 4, the damper plate 244 includes springs 242 disposed within radially-spaced spring pockets 246 to absorb the impact of lock-up clutch engagement.

Figure 5:
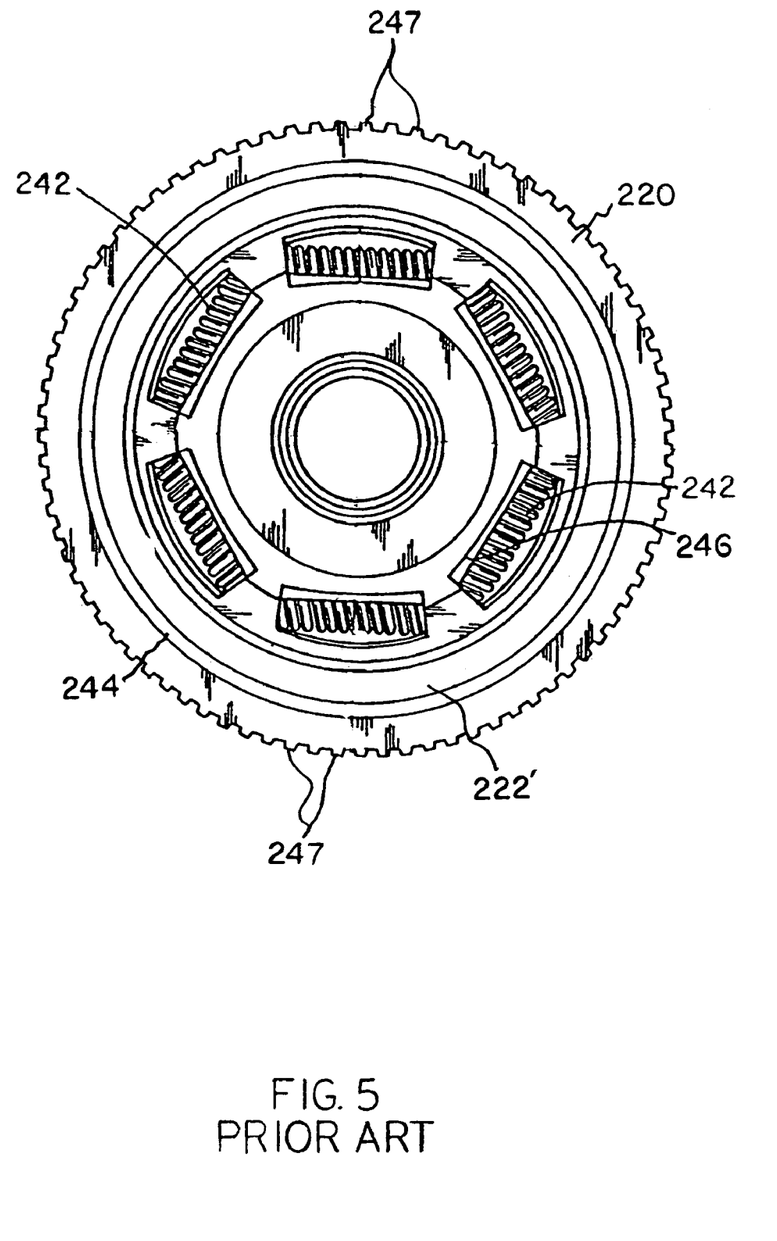
FIG. 5 is a cross-sectional view of the FORD transmission lock-up clutch as seen from the section line 5-5 of FIG. 4 and is labeled Prior Art.

In operation when the vehicle is cruising and lock-up is appropriate, an electric solenoid is energized which opens the converter clutch control valve (not shown) increasing ATF pressure in the apply chamber 180. This allows ATF pressure to act upon the pressure plate 220 to actuate the lock-up clutch. Friction plate 224 is guided forward in an axial direction by an array of teeth 247 formed about the periphery thereof as shown in FIG. 5. In the FORD transmissions teeth 247 on the friction plate 244 traverse an array of mating embossments 274 formed in the cover 225 by the so-called "Grob" method as hereinafter explained. Friction plate 224 together with pressure plate 220 act upon the damper assembly 240, which, in turn, is forced against the lock-up surface 245 on the front cover. Pressure plate 220 is also connected to the transmission input shaft (not shown) via turbine hub 201 and, thus, a direct mechanical link between the engine and transmission is established.

When converter lock-up is no longer required, a port opens that allows pressurized ATF to flow into the clutch release chamber 170 thereby releasing the lock-up clutch assembly 200. ATF then flows out of the apply chamber 280 and the pressure plate 220 moves away from the lock-up surface 245 re-establishing the fluid coupling.

Figure 6:
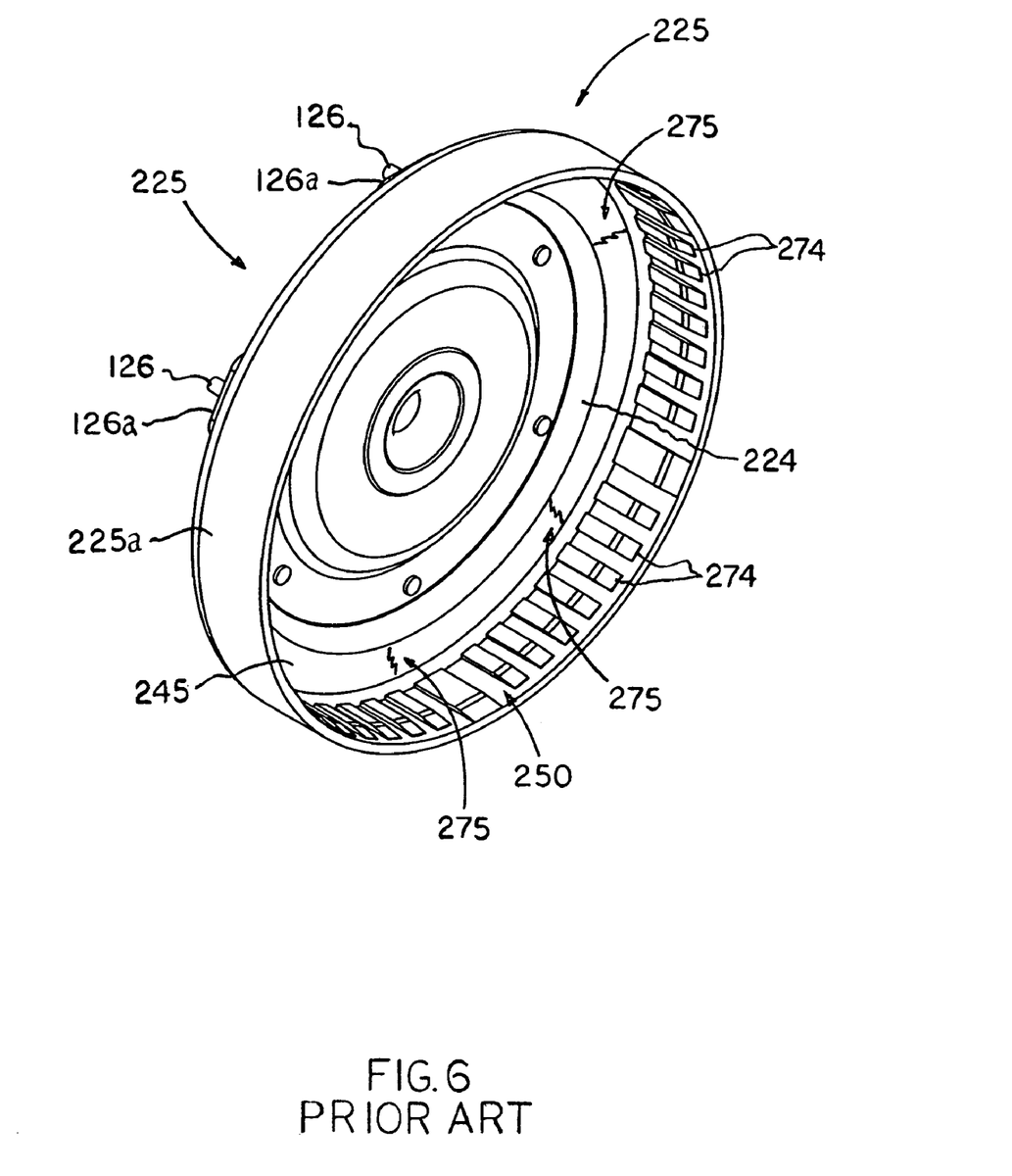
FIG. 6 is a perspective view of a torque converter cover for the FORD E4OD transmission showing an array of embossments formed therein and is labeled Prior Art.

Referring to FIG. 6, the FORD E4OD torque converter cover 225 is known in the industry as a "Grob cover" referring to Ernst Grob AG of Switzerland. Grob is the originator of a metal forming (i.e. cold forming) process utilized to form a simulated internal spline, indicated generally at 250, comprised of an array of peripherally-spaced embossments 274 formed in cover 225. A cold forming process suitable for fabricating the FORD E4OD cover 225 is referred to in the industry as the "Grob cold-rolling method" or "Grob method". Tooling for cold forming workpieces of the kind described in this specification is manufactured by Ernst Grob AG of Switzerland, Kaltwalzmaschinen, Rohrgasse 9, 8708 Mannedorf, Switzerland.

Figure 7A:
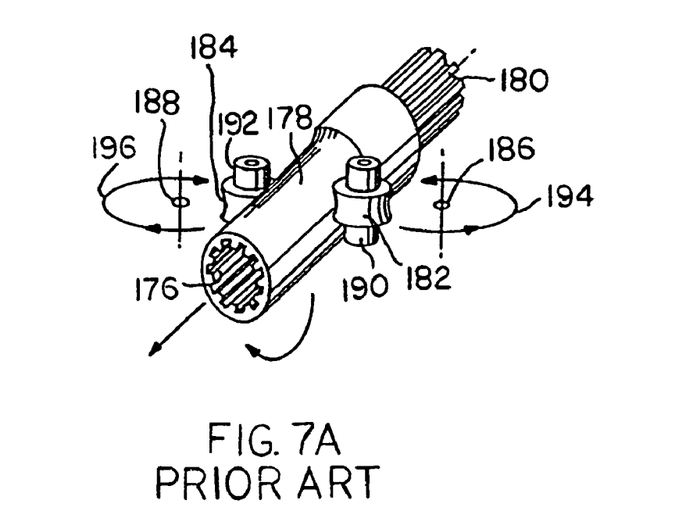
FIG. 7A is a schematic representation of a cold rolling machine for producing a simulated internal spline in a hollow member and is labeled Prior Art.
Figure 7B:
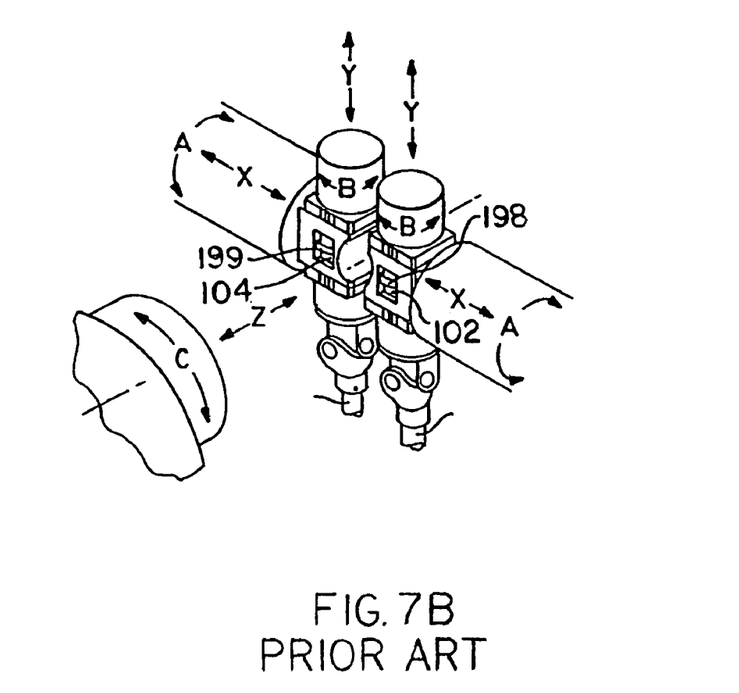
FIG. 7B is a schematic representation of a cold rolling machine using movable roller heads that are adapted to form simulated spline teeth on the periphery of a cylindrical member.

The prior art Grob cover 225 is formed by a cold forming process using apparatus of the type schematically illustrated in FIGS. 7A and 7B. FIG. 7A shows a prior art device for cold forming embossments 176 on a hollow tubular member 178. It involves placing the tubular member 178 over a forming die or mandrel 180 on which are formed external spline teeth. Rotary die heads 182, 184 are rotated about their respective axes 186 and 188 being carried by stub shafts 190 and 192 respectively.

When the roller heads 182, 184 follow the orbital motion pattern shown by directional arrows 194, 196, the roller heads impact the hollow member 178 thereby dynamically forging the material of the hollow member and forming embossments 176 whose geometry is determined by the geometry of the external teeth 180 of the central die. The same concept is used on an apparatus of the type shown in FIG. 7B where the roller heads are formed with spline tooth forming portions 198, 199 formed on roller heads 102, 104 respectively. The embossment forming portions 198, 199 displace the metal into the spline tooth spaces of the mandrel 180. At the same time metal flows in the axial direction causing the axial length of the workpiece to increase as the metal is displaced radially.

Although the apparatus shown in FIGS. 7A-7B is not directly adaptable in the form shown for forming embossments 274 in the cover 225 (FIG. 6), the same principles are applied in its manufacture. The cylindrical portion 225a of the cover 225 can be mounted by specially designed holding fixtures (not shown), which correspond to the holding fixtures for the work pieces of FIGS. 7A-7B. Thus, roller heads 102, 144 can be mounted for rotation about the Y axes illustrated in FIG. 7B such that the roller heads will impact the outer periphery of the cylindrical portion 225a of the cover 225 and displace metal inward to form the embossments 274 as the work piece is fed toward the roller heads in the direction of the Z axis illustrated in FIG. 7B. The cover 225 can be indexed in the direction indicated by the symbol "C" in FIG. 7B such that the embossments 274 can be formed about the periphery of the cover as shown in FIG. 6.

Although the Grob cover 225 may fulfill the requirements of smaller truck drivetrains, the Grob process has inherent limitations which result in chronic torque converter malfunctions that typically occur when the FORD E4OD and 4R100 transmissions including the Grob cover are matched with a higher powered diesel engine, which is a popular option in FORD F-250 and F-350 pick-up trucks.

Initially, the Grob method must be utilized with relatively soft, ductile steel materials having a limited dimensional thickness (0.175 inches nominal) to facilitate cold forming of the simulated spline 250. This results in a relatively low wall thickness at the cylindrical portion 225a of the Grob cover 225 in proximity to the embossments 274 (FIG. 9B) as at 227.

Fabrication from such ductile sheet steel of a limited thickness results in a cover 225 that does not provide adequate structural support for the threaded studs 126 in diesel engine applications. It will be appreciated that studs 126 include perpendicular stud flanges 126a (FIG. 4), which are attached to the outer surface of radial wall 224 of the cover 225 by weldment. The welding process hardens the area in proximity to the stud flanges 126a introducing a stress concentration in the surrounding material. As a result a common service complaint on the Grob cover 225 in FORD F-250 and F-350 diesel pick-up trucks is that the cover 225 often develops stress cracks adjacent the stud flanges 126a. Eventually stress cracks break through the cover 225 into the lock-up surface 245 as at 275 (FIG. 6) creating interruptions in the lock-up surface and causing disintegration of the friction material 222' on damper plate 244, which results in malfunction of the lock-up clutch and failure of the torque converter.

In addition, the aforementioned limited material thickness results in a cover 225 wherein the lock-up surface 245 has insufficient mass to provide adequate heat dissipation within the lock-up surface. As a result the lock-up surface 245 is subject to overheating and distortion in diesel engine applications.

Figure 8:
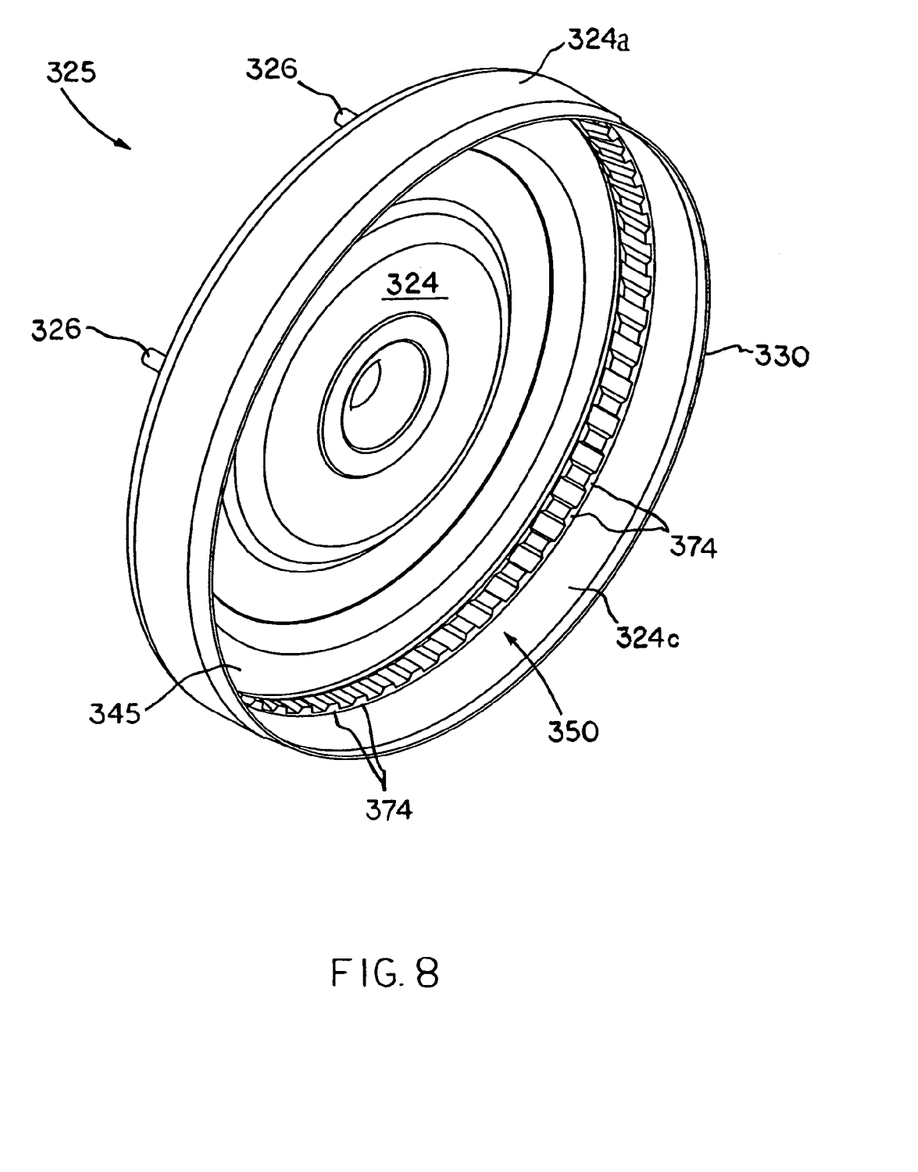
FIG. 8 is a perspective view of a heavy-duty torque converter cover of the present invention illustrating a true internal spline formed therein.

Thus, the present invention has been developed to resolve these problems and will now be described. The present invention is a heavy-duty torque converter cover, illustrated in FIG. 8 and indicated generally at 325, designed for direct replacement of the OEM cover 225 in FORD diesel pick-up trucks and other diesel engine applications.

Initially, cover 325 is machined from a high grade American Iron and Steel Institute (AISI 1026) steel forging in comparison to the lesser grade (AISI 1018 or comparable grade) ductile steel sheet typically utilized in the OEM cover 225.

Figure 10A:
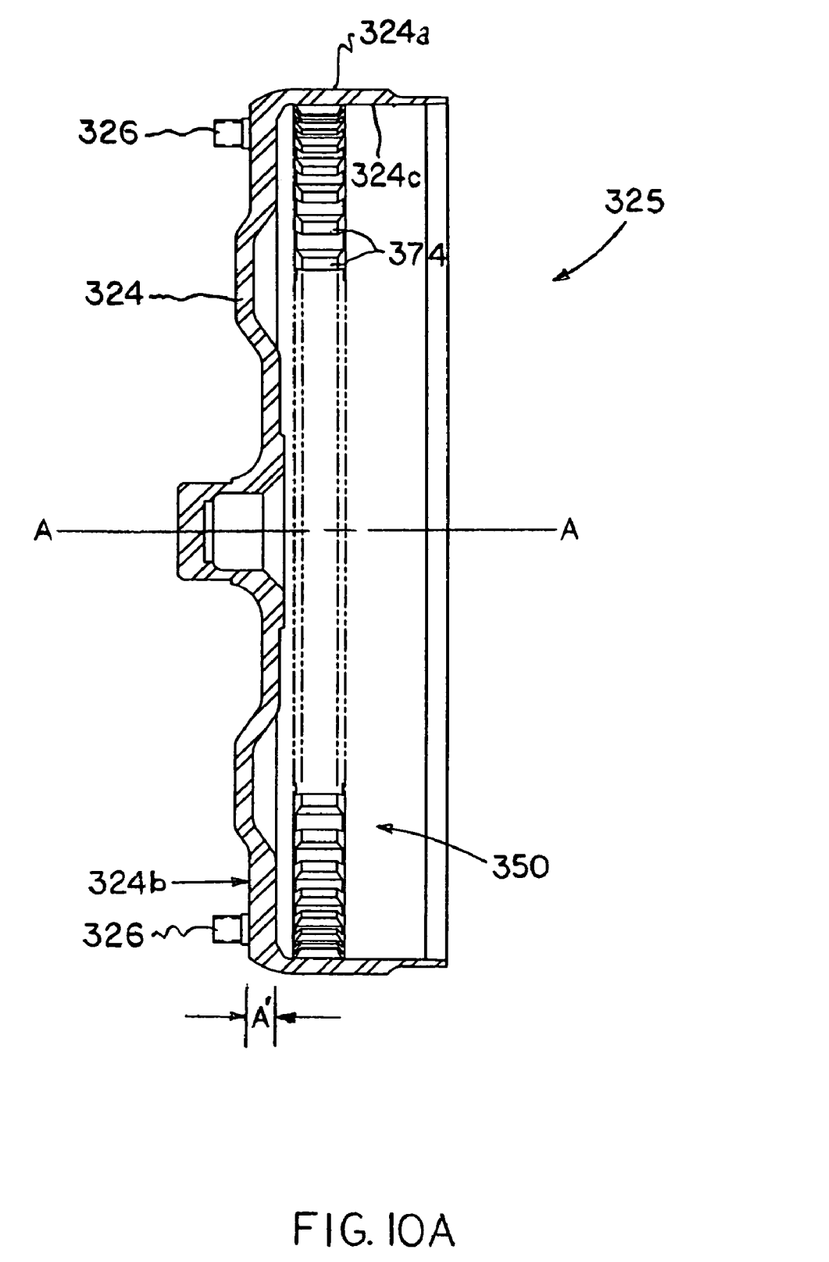
FIG. 10A is a longitudinal cross-section of the present torque converter cover.

Cover 325 comprises a drum-shaped body member 330 having a radial wall 324 extending in generally perpendicular relation to the longitudinal axis -A- (FIG. 10A). Radial wall 324 includes an outer peripheral portion defining a lock-up surface 345. An integral cylindrical portion 324a of the cover 325 having an inner surface 324c extends axially from the radial wall 324 in concentric relation to axis -A-.

In the embodiment shown the present cover 325 includes a 54 tooth internal spline, indicated generally at 350, which is manufactured in accordance with the American National Standards Institute (ANSI) B92.1-1996 Involute Splines and Inspection standard and the terms and definitions thereof, which are incorporated herein by reference. Of course, numerous other spline configurations manufactured in accordance with the ANSI B92.1-1996 standard are considered to be within the scope of the present invention and, thus, the embodiment shown herein is intended to be merely illustrative and not restrictive in any sense.

Internal spline 350 including spline teeth 374 is machined from inner surface 324c and dimensioned for mating engagement with teeth 247 formed on the OEM friction plate 224. Critical to the present invention internal spline 350 provides up to a 70% increase in spline tooth engagement (i.e. tooth flank contact) with the mating teeth 247 formed on the OEM friction plate 224 in comparison to the tooth engagement achieved in the simulated spline 250 in the FORD E4OD cover 225 as produced by the Grob method. The increased spline tooth engagement is calculated based on spline data and dimensions and is achieved by machining spline 350 from solid stock with conventional gear shaping equipment, which provides more accurate spline dimensions, less variation in tooth form, and substantially increased mating tooth contact between the spline 350 and friction plate 224. Spline tooth engagement achieved with the present internal spline 350 can range up to a 70% increase in comparison to the simulated OEM spline 250 depending on the blueprint tolerances specified for the spline dimensions.

Figure 9A:
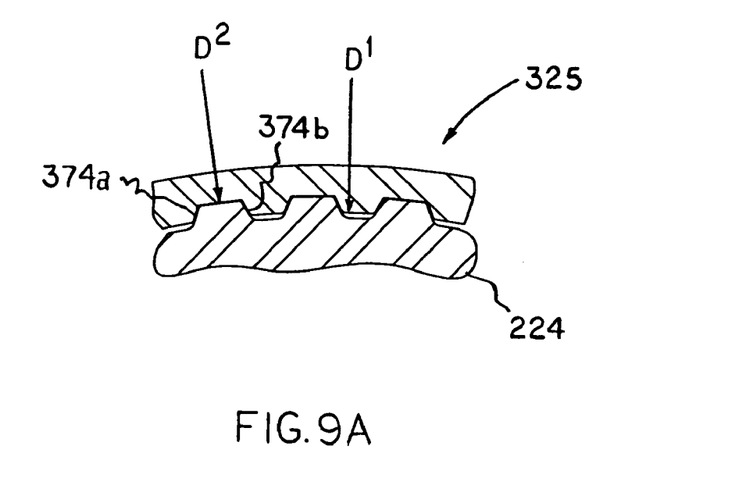
FIG. 9A is a partial end view of the present torque converter cover illustrating an increased spline tooth engagement with the mating OEM friction plate.
Figure 9B:
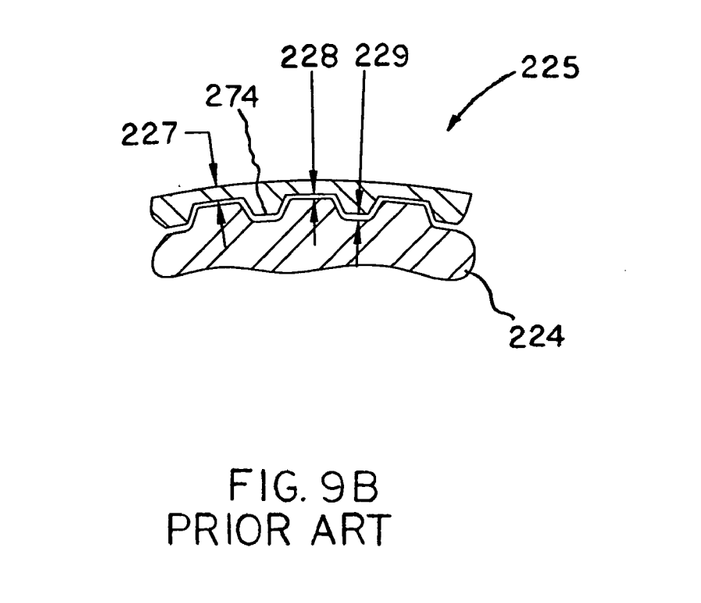
FIG. 9B is a partial end view of the FORD E4OD torque converter cover illustrating reduced spline tooth engagement with the mating OEM friction plate and is labeled Prior Art.

More particularly, it will be understood that the major diameter ($D^1$) and minor diameter ($D^2$) of the spline 350 are machined to a closer blueprint tolerance in the present spline 350 thereby increasing the actual length of tooth flank surfaces 374a, 374b (FIG. 9A). This machining method provides increased tooth-to-tooth contact on the tooth flank surfaces 374a, 374b as shown in the comparison views of FIGS. 9A and 9B. The difference in spline tooth engagement between the present cover 325 with the mating friction ring 224 as compared to the OEM cover 225 with the mating friction ring 224 is most clearly shown in FIG. 9B at the root and crest of each embossment 274 where substantial gaps as at 228, 229 appear in the OEM version.

Thus, the present torque converter cover 325 provides up to a 70% increase in spline tooth engagement with the mating friction plate 224 of the lock-up clutch assembly resulting in increased torque capacity for the lock-up clutch, reduced wear on the tooth flank surfaces of the friction plate 224, and improved service longevity for the torque converter.

Figure 10B:
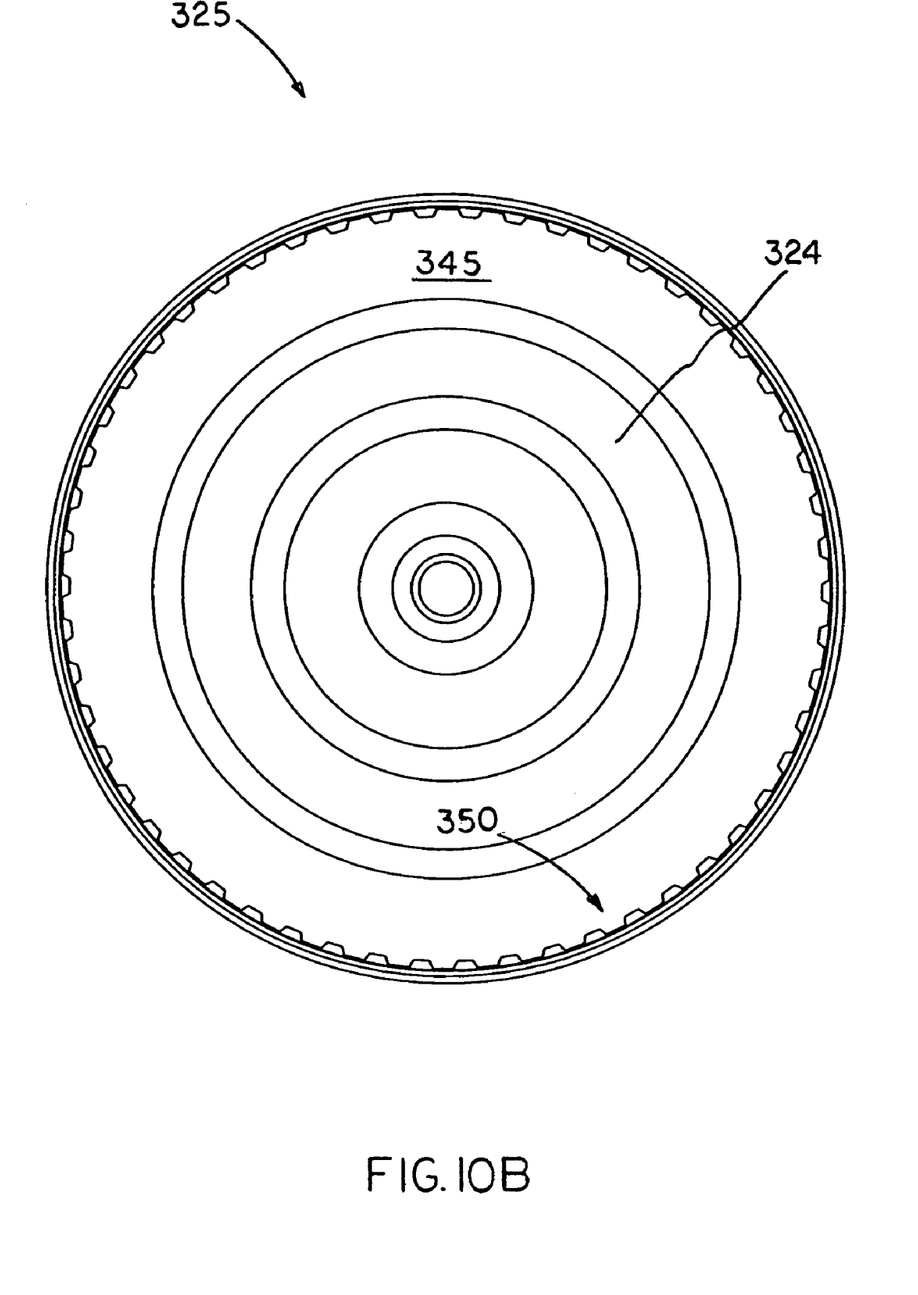
FIG. 10B is an axial view of the present torque converter cover illustrating a true internal spline formed therein.

Referring to FIGS. 10A and 10B it can be seen that the stud flanges 126a of the OEM cover 225 have been omitted in the present cover 325, but the thickness (i.e. axial length A') of the cover 325 at the lock-up surface 345 has been increased to a length equivalent to the sum of the axial stack-up dimensions (i.e. axial length A) of the OEM cover 225 (0.175 inches nominal) at the lock-up surface 245 plus the thickness (i.e. axial length F) of the stud flanges 126a (0.200 inches nominal) as previously shown in FIG. 4. Stated differently, A+F=A', where A' (0.375 inches nominal) or 0.365-0.385 inches is the axial length of the lock-up surface 345 in the present cover 325. Thus, the critical working surfaces of OEM cover 225 (i.e. axial positions of lock-up surface 245 and mounting surface of flanges 126a) which abut the engine flywheel (not shown) are maintained in the present cover 325 (i.e. axial positions of lock-up surface 345 and mounting surface 324b) to ensure proper installation and function of the present replacement cover.

The increased axial length A' (i.e. thickness) of the lock-up surface 345 lends substantially more structural support and strength to studs 326, which are welded directly to the exterior surface 324b of the present cover 325. In the cover 325 the increased axial length A' also eliminates the aforementioned stress cracking problem in proximity to OEM studs 126 caused by the stud weldments. In addition, heat dissipation within the lock-up surface 345 is substantially improved due to the increased thickness (i.e. axial length A') of the lock-up surface.

Although not specifically illustrated in the drawings, it should be understood that additional equipment and structural components will be provided as necessary and that all of the components described above are arranged and supported in an appropriate fashion to form a complete and operative Heavy-Duty Torque Converter Cover incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

I claim:

1. A replacement torque converter cover for replacement of an original equipment torque converter cover within an automatic transmission of a land vehicle, wherein said original equipment torque converter cover includes a drum-shaped member having a longitudinal axis, a radial wall perpendicular to said axis, wherein said radial wall further includes an original equipment lock-up surface having an axial length dimension, a plurality of threaded studs including integral stud flanges having an axial length dimension, wherein said stud flanges are mounted on an exterior surface of said radial wall for attachment of said cover to an engine of said vehicle, said drum-shaped member further including an integral cylindrical portion having an inner surface extending axially from said radial wall in concentric relation to said axis, wherein said inner surface includes an array of simulated spline embossments disposed at spaced intervals for mating engagement with at least one friction disc, wherein said at least one friction disc forms part of a lock-up clutch assembly installed within said cover, wherein said replacement torque converter cover comprises:

replacement drum-shaped member including a radial wall having an inner surface, wherein said inner surface comprises a modified lock-up surface having an increased axial length dimension equivalent to the sum of said axial length dimensions of said original equipment lock-up surface and said integral stud flanges; and a true internal spline machined on said inner surface of said cylindrical portion of said replacement drum-shaped member, wherein said true internal spline provides up to a 70% increase in spline tooth engagement with said mating friction disc in comparison to the spline tooth engagement achieved by said array of simulated spline embossments with said mating friction disc imparting increased torque capacity to said lock-up clutch assembly.

2. The replacement torque converter cover of claim 1 wherein said true internal spline is comprised of fifty-four spline teeth.

3. The replacement torque converter cover of claim 1 wherein said true internal spline is machined with conventional gear shaping equipment in accordance with ANSI B92.1-1996 Involute Splines and Inspection standard.

4. The replacement torque converter cover of claim 1 wherein said axial length dimension of said modified lock-up surface measures in the range of 0.365-0.385 inches.

5. The replacement torque converter cover of claim 1 wherein said replacement torque converter cover is manufactured from a steel forging in accordance with American Iron and Steel Institute (AISI 1026) specifications.

6. An improved torque converter cover for replacing an original equipment torque converter cover within an automatic transmission of a land vehicle, wherein said original equipment torque converter cover includes a drum-shaped member having a longitudinal axis, a radial wall including an outer peripheral portion defining an original equipment lock-up surface having an axial length dimension, a plurality of threaded studs including integral stud flanges having an axial length dimension, wherein said stud flanges are mounted on an exterior surface of said radial wall for attachment of said cover to an engine of said vehicle, said drum-shaped member further including an integral cylindrical portion having an inner surface extending axially from said radial wall, wherein said inner surface includes an array of simulated spline embossments disposed at spaced intervals for mating engagement with at least one friction disc, wherein said friction disc forms part of a lock-up clutch assembly installed within said cover, wherein the improvement comprises:

a replacement torque converter cover having a longitudinal axis, wherein said replacement torque converter cover includes a radial wall having an inner surface, wherein said inner surface comprises a modified lock-up surface having an axial length dimension equivalent to the sum of the axial length dimensions of said original equipment lock-up surface and said integral stud flanges.

7. The improved torque converter cover of claim 6 wherein said replacement torque converter cover includes a true internal spline formed on said inner surface of said cylindrical portion of said cover, wherein said true internal spline provides up to a 70% increase in spline tooth engagement with said mating friction disc in comparison to the spline tooth engagement achieved by said array of simulated spline embossments with said mating friction disc imparting increased torque capacity to said lock-up clutch assembly.

8. The improved torque converter cover of claim 7 wherein said true internal spline is comprised of fifty-four spline teeth.

9. The improved torque converter cover of claim 7 wherein said true internal spline is machined with conventional gear shaping equipment in accordance with ANSI B92.1-1996 Involute Splines and Inspection standard.

10. The improved torque converter cover of claim 6 wherein said axial length dimension of said modified lock-up surface measures in the range of 0.365-0.385 inches.

11. The improved torque converter cover of claim 6 wherein said replacement torque converter cover is manufactured from a steel forging in accordance with American Iron and Steel Institute (AISI 1026) specifications.

12. An improved torque converter for an automatic transmission of the type including an impeller assembly, a turbine assembly, a stator assembly, a lock-up clutch assembly, and an original equipment torque converter cover welded to said impeller assembly enclosing said turbine assembly, said stator assembly, and said lock-up clutch assembly therein, wherein said original equipment torque converter cover includes a drum-shaped member having a radial wall including an original equipment lock-up surface having an axial length dimension, a plurality of threaded studs including integral stud flanges having an axial length dimension, wherein said stud flanges are mounted on an exterior surface of said radial wall for attachment of said cover to an engine flywheel, said original equipment torque converter cover further including an integral cylindrical portion having an inner surface extending axially from said radial wall, wherein said inner surface includes an array of simulated spline embossments disposed at spaced intervals for mating engagement with a friction disc, wherein said friction disc forms a part of said lock-up clutch assembly installed in said cover, wherein the improvement comprises:

a replacement torque converter cover having a longitudinal axis, wherein said replacement torque converter cover includes a radial wall having an inner surface, wherein said inner surface comprises a modified lock-up surface having an increased axial length dimension equivalent to the sum of the axial length dimensions of said original equipment lock-up surface and said integral stud flanges.

13. The improved torque converter of claim 12 wherein said replacement torque converter cover includes a true internal spline formed on said inner surface of said cylindrical portion of said replacement torque converter cover, wherein said true internal spline provides up to a 70% increase in spline tooth engagement with said mating friction disc in comparison to the spline tooth engagement achieved by said array of simulated spline embossments with said mating friction disc imparting increased torque capacity to said lock-up clutch assembly.

14. The improved torque converter of claim 13 wherein said true internal spline is comprised of fifty-four spline teeth.

15. The improved torque converter of claim 13 wherein said true internal spline is machined with conventional gear shaping equipment in accordance with ANSI B92.1-1996 Involute Splines and Inspection standard.

16. The improved torque converter of claim 12 wherein said axial length dimension of said modified lock-up surface measures in the range of 0.365-0.385 inches.

17. The improved torque converter of claim 12 wherein said replacement torque converter cover is manufactured from a steel forging in accordance with American Iron and Steel Institute (AISI 1026) specifications.

* * * * *